United States Patent
Nakazawa et al.

(10) Patent No.: US 6,812,608 B2
(45) Date of Patent: Nov. 2, 2004

(54) DIRECT CURRENT MOTOR HAVING FIELD MAGNETS FORMED BY INJECTION MOLDING SYNTHETIC RESIN, WITH WHICH MAGNETIC PARTICLES ARE MIXED, TO THE INNER PERIPHERY OF THE STATOR CORE

(75) Inventors: Fumikiyo Nakazawa, Kanagawa (JP); Osamu Sakurai, Isehara (JP); Tsugiyoshi Ono, Zama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/671,839

(22) Filed: Sep. 25, 2003

(65) Prior Publication Data

US 2004/0056548 A1 Mar. 25, 2004

Related U.S. Application Data

(63) Continuation of application No. PCT/JP02/04014, filed on Apr. 23, 2002.

(30) Foreign Application Priority Data

Apr. 25, 2001 (JP) ........................................ 2001-127716
Aug. 10, 2001 (JP) ........................................ 2001-244130

(51) Int. Cl.[7] .............................. H02K 1/17; H02K 1/18; H02K 23/04
(52) U.S. Cl. ............................. 310/154.11; 310/154.21; 310/154.03; 310/44
(58) Field of Search ................................ 310/154.3, 11, 310/17–19, 21, 22, 44, 43, 154.17–154.19; 29/596

(56) References Cited

U.S. PATENT DOCUMENTS

| 4,104,787 A | * | 8/1978 | Jandeska et al. ............... 29/596 |
| 4,453,097 A | * | 6/1984 | Lordo .................... 310/154.07 |
| 4,508,988 A | * | 4/1985 | Reiss et al. ............ 310/154.22 |
| 5,668,429 A | * | 9/1997 | Boyd et al. .................. 310/254 |

FOREIGN PATENT DOCUMENTS

| EP | 0 895 334 A2 | 2/1999 | ............ H02K/1/17 |
| FR | 2617345 | * 6/1987 | ............ H02K/1/18 |

(List continued on next page.)

OTHER PUBLICATIONS

Microfilm of the specification and drawings annexed to the request of Japanese Utility Model Appln. No. 17641/1984 (Laid–open No. 132148/1985) (Mitsubishi Electric Corp.) Sep. 4, 1985, p. 3, line 4 to p. 4, line 20, Figs. 1, 2.

Microfilm of the specification and drawings annexed to the request of Japanese Utility Model Appln. No. 9455/1988 (Laid–open No. 116577/1989) (Matsushita Electric Industrial Co., Ltd.), Aug. 26, 1997, Par. Nos. [0017] to [0059]; Figs. 1, 2.

*Primary Examiner*—Karl Tamai
(74) *Attorney, Agent, or Firm*—Frishauf, Holtz, Goodman & Chick, P.C.

(57) ABSTRACT

Field magnets are attached to an inner periphery of a stator core, which defines a rotor through hole. The stator core has a plurality of recesses open to the rotor through hole. Each recess faces magnet end portions of the field magnets. The recess surface of the recess is away from the surface AC of the magnet end portion and set back toward an outer periphery of the stator core from a rear surface AD of the magnet end portion.

6 Claims, 7 Drawing Sheets

FOREIGN PATENT DOCUMENTS

| | | | | |
|---|---|---|---|---|
| JP | 58-141658 A | 8/1983 | ．．．．．．．．．． | H02K/23/04 |
| JP | 8-65940 A | 3/1996 | ．．．．．．．．．． | H02K/23/04 |
| JP | 9-224337 A | 8/1997 | ．．．．．．．．．． | H02K/23/04 |
| JP | 2000-050537 A | 2/2000 | ．．．．．．．．．． | H02K/23/04 |
| JP | 2002-223537 * | 8/2002 | ．．．．．．．．．． | H02K/23/04 |
| JP | 2003-61274 * | 2/2003 | ．．．．．．．．．． | H02K/1/17 |

* cited by examiner

DIRECT CURRENT MOTOR HAVING FIELD MAGNETS FORMED BY INJECTION MOLDING SYNTHETIC RESIN, WITH WHICH MAGNETIC PARTICLES ARE MIXED, TO THE INNER PERIPHERY OF THE STATOR CORE

CROSS-REFERENCE TO RELATED APPLICATIONS

This is a Continuation Application of PCT Application No. PCT/JP02/04014, filed Apr. 23, 2002, which was not published under PCT Article 21(2) in English.

This application is based upon and claims the benefit of priority from the prior Japanese Patent Applications No. 2001-127716, filed Apr. 25, 2001; and No. 2001-244130, filed Aug. 10, 2001, the entire contents of both of which are incorporated herein by reference.

BACKGROUND OF THE INVENTION

1. Field of the Invention

The present invention relates to a motor driven by a direct-current power supply, and more particularly to an inner-rotor type direct current motor, wherein the rotor is arranged inside the stator having a plurality of field magnets which generate a magnetic field.

2. Description of the Related Art

A direct current motor with brushes is used as, for example, a motor section of an motor-blower for use in a battery-driven electric vacuum cleaner. The direct current motor has a stator including a stator core, which defines a circular rotor through hole, and two field magnets attached on the circular inner periphery of the stator core.

The field magnets are both arc-shaped. The field magnets may be of the type arc-shaped in advance and attached by adhesive to the inner periphery of the stator core or the type injection-molded to an arc shape and attached to the inner periphery of the stator core. The field magnet of the latter type is made of magnetic particle-mixed synthetic resin, and commonly called a plastic magnet.

A part of the circular inner periphery of the stator core to which the field magnets are attached is exposed through a gap between the end portions of the field magnets (hereinafter referred to as magnet end portions). The field magnets are magnetized in the thickness directions. Here the thickness direction means radial directions connecting the inner periphery surface and the outer periphery surface of the stator core.

At the magnet end portions of the magnetized field magnets, magnetic flux flows from the north pole to the south pole. The flow of the magnetic flux is called magnetic flux leakage. The magnetic flux leakage is one of the factors that reduce the torque of the rotor arranged inside the stator. Therefore, it is desirable to reduce the magnetic flux leakage as little as possible.

As described before, the inner periphery of the stator core is circular. Hence, the portion of the inner periphery of the stator core that exposed through the gap between the magnet end portions of the adjacent field magnets is located on an extension of the rear surfaces of the field magnets. The distance from the portion of the inner periphery between the magnet end portions to the surface of each magnet end is short. Particularly in the case where the field magnet is formed of a rare-earth magnet having a high energy product, the magnet is thin. For this reason, if a rare-earth magnet is used as the field magnet, the distance is shorter.

The stator core easily passes magnetic flux by nature. As described above, the exposed portion of the inner periphery of the core is located at a very short distance from the surfaces of the magnet ends. In this structure, the magnetic flux from the north pole to the south pole at the magnet end portions easily passes through the exposed portion of the inner periphery. Thus, when there is much magnetic flux leakage at the magnet end portions, the torque that rotates the rotor is reduced.

To injection-mold a plastic magnet and attach it to the inner periphery of the stator core, a pair of molding dies are used. The molding dies are used such that they sandwich the stator core in the thickness direction. One of the molding dies has an insertion die portion. The stator core has a rotor through hole in a central portion thereof. In the injection molding, the insertion die portion is inserted into the rotor through hole. The inserted insertion die portion forms a cavity between itself and the inner periphery of the stator core.

To form the cavity, the insertion die portion is brought into contact with the inner periphery of the stator core. The cavity is formed so as to correspond to the shape of the field magnet. The cavity is filled with the plastic magnet by injection. As a result, the field magnet is injection molded to the inner periphery of the stator core.

The insertion die portion, which is inserted in and removed from the rotor through hole in the injection molding, is brought into contact with the inner periphery of the stator core. Thus, since the insertion die portion inevitably wears with time, the lifetime of the molding die is short.

As the wear of the insertion die portion proceeds, thin burr-like portions projecting from the ends of the field magnet are formed. The projecting portions easily peel after molding. When the projecting portions begin to exfoliate, the field magnet may be liable to peel off from the inner periphery of the stator core, triggered by the exfoliation.

An object of the present invention is to provide a direct current motor, which suppresses the magnetic flux leakage at the magnet end portions of the field magnets and increases the torque of the rotor.

BRIEF SUMMARY OF THE INVENTION

In a direct current motor of the present invention, a plurality of field magnets are attached to the inner periphery of a stator core, which defines a rotor through hole. The stator core has recesses facing magnetic end portions of the field magnets. The recesses open to the rotor through hole. Each recess has a surface (herein after referred to as a recess surface), which is away from the surface of the magnetic end portions, and set back toward the outer periphery of the stator core from the rear surface of the magnet end portion.

In this invention, the stator core may be formed of a magnetic plate of magnetic metal, for example, a silicon steel plate. The field magnet may be formed not by injection molding, or by injection molding plastic magnet. It is preferable that the field magnet be formed of a rare-earth magnet, since the torque can be more increased or the direct current motor can be more compact.

In this invention, the recess may be extended to the rear sides of the magnet end portions. The recess preferably extends across the magnet end portions of the adjacent field magnets. However, recesses may be formed to correspond to the respective magnet end portions.

According to the direct current motor of the present invention, since the recesses are formed in the stator core, the distance between the recess surface and the surface of a magnet end portion is lengthened. Magnetic resistance is obtained by air in the recess. Therefore, the magnetic flux flowing from the north pole to the south pole at the magnet end portions through the stator core, which easily passes magnetism, can be reduced. Accordingly, the magnetic flux can be efficiently used, thereby increasing the torque of the rotor.

DETAILED DESCRIPTION OF THE INVENTION

The first embodiment of the present invention will now be described with reference to the drawings.

Figure 1A:
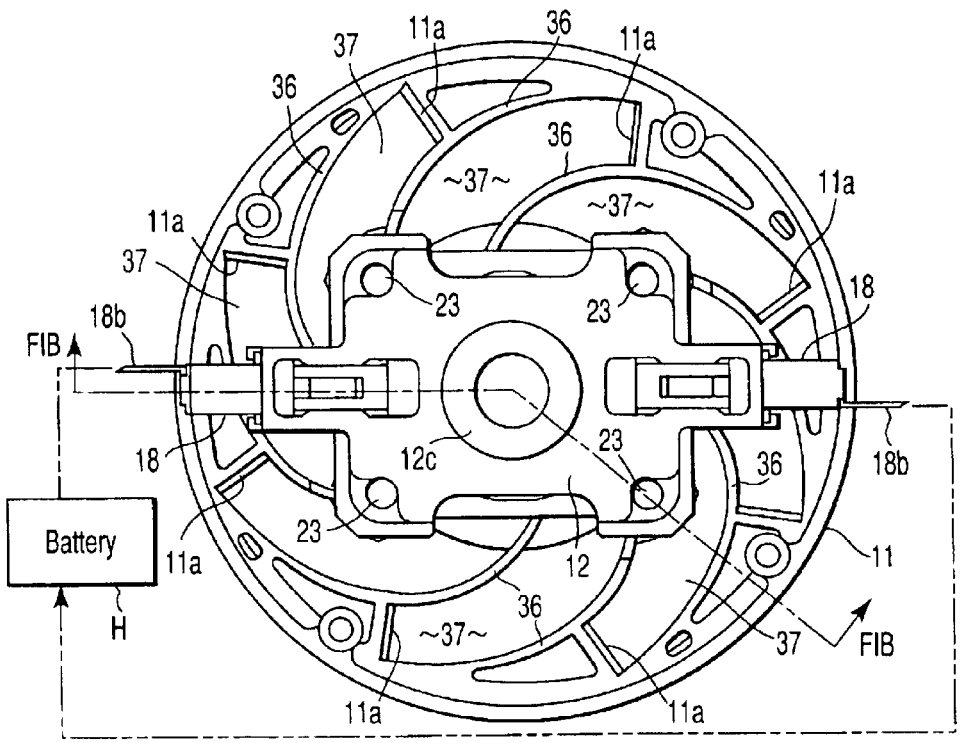
FIG. 1A is a backside view of an motor-blower including a direct current motor according to a first embodiment of the present invention.
Figure 1B:
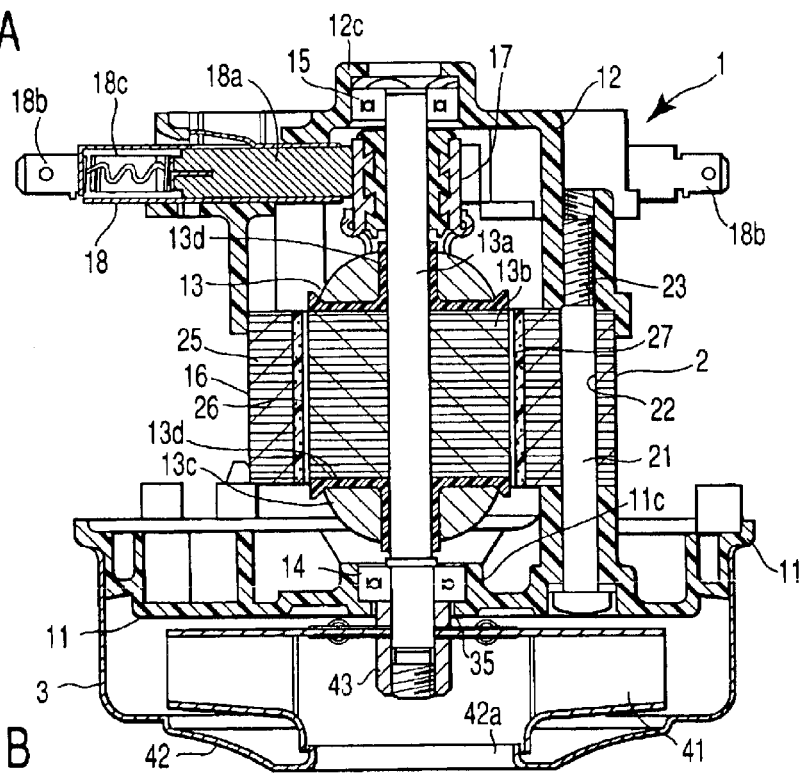
FIG. 1B is a cross-sectional view of the motor-blower taken along the line F1B—F1B in FIG. 1A.

The motor-blower 1 shown in FIGS. 1A and 1B includes a motor section 2 and a fan section 3. The motor-blower 1 is used as a vacuum suction source of an electric vacuum cleaner. The motor-blower 1 is driven by a direct-current power source, for example, a storage battery H.

The motor section 2 constitutes a bipolar direct current motor. The motor section 2 has a pair of motor frames 11 and 12, a rotor 13, a pair of bearings 14 and 15, a stator 16, a commutator 17 and a pair of brush devices 18.

The motor frames 11 and 12 are made of, for example, hard synthetic resin. As shown in FIG. 1B, bearing receiving portions 11c and 12c are formed in the motor frames 11 and 12.

The motor frames 11 and 12 support the stator 16. More specifically, the motor frames 11 and 12 sandwich the stator 16 on the opposite sides thereof in the thickness direction, and are connected to the stator 16. The connection is achieved by four screws 21 (FIG. 1B shows only one of them as a representative).

Each screw 21 is inserted through the one motor frame 11 and screwed into a connection hole 23 of the other motor frame 12. Middle portions of the respective screws 21 pass through screw through holes 22 formed in four corner portions of the stator 16 shown in FIG. 2A.

As shown in FIG. 1B, the rotor 13 has a rotary shaft 13a, an armature core 13b, a coil 13c, the commutator 17 and the pair of bearings 14 and 15.

The rotary shaft 13a passes through a central portion of the armature core 13b. The coil 13c is wound around the armature core 13b. An insulating member indicated by a reference symbol 13d in FIG. 1B insulates the coil 13c from the rotary shaft 13a and the armature core 13b.

The bearings 14 and 15 are rolling-type bearings. The bearings 14 and 15 are respectively attached to the ends of the rotary shaft 13a. One end of the rotary shaft 13a passes through the bearing 14. The commutator 17 is attached to the rotary shaft 13a. The commutator 17 is located between the armature core 13b and the bearing 15. The commutator segments of the commutator 17 are respectively connected to terminal portions of the armature coil 13c.

The bearings 14 and 15 of the rotor 13 are received by the bearing receiving portions 11c and 12c. As a result, the rotor 13 is rotatably supported across the motor frames 11 and 12. A shaft through hole 35 is formed in a central portion of the motor frame 11. The end of the rotary shaft 13a, which passes through the bearing 14, is inserted through the shaft through hole 35.

Figure 2A:
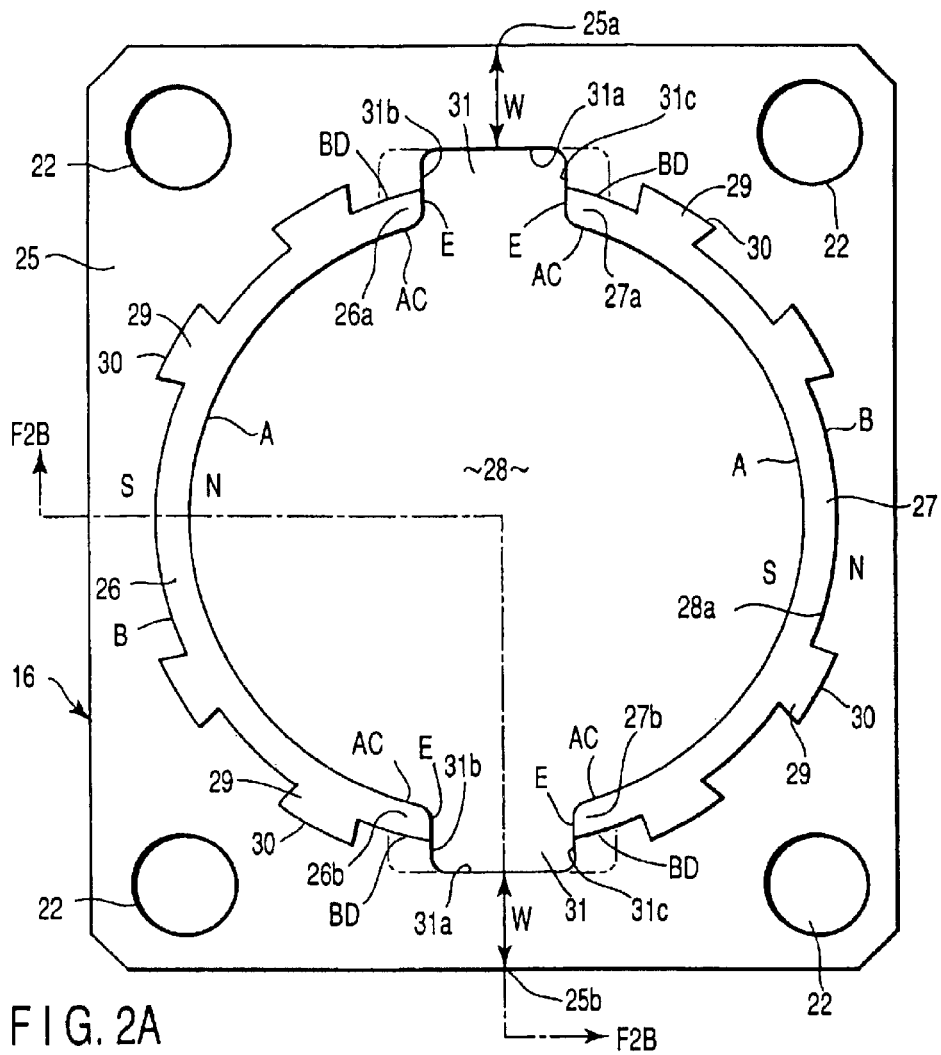
FIG. 2A is a plan view of a stator included in the direct current motor shown in FIGS. 1A and 1B.
Figure 2B:
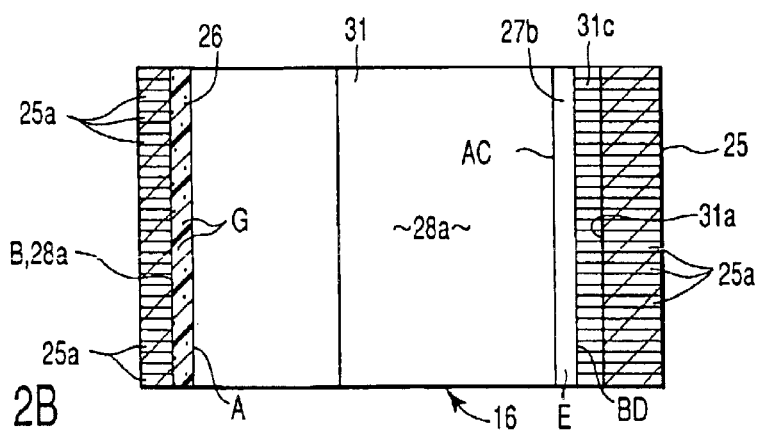
FIG. 2B is a cross-sectional view of the stator taken along the line F2B—F2B in FIG. 2A.

As shown in FIGS. 2A and 2B, the stator 16 is comprised of a stator core 25 and a plurality of, for example, two field magnets 26 and 27. The stator core 25 functions as a yoke. The field magnets 26 and 27 generate a field. As shown in FIG. 1B, the stator 16 surrounds the armature core 13b of the rotor 13.

As shown in FIG. 2B, the stator core 25 is formed of a stack of a number of core plates 25a. The core plates 25a are formed of silicon steel plates stamped into the same shape.

As shown in FIG. 2A, the outer shape of the stator core 25 is substantially rectangular in a plan view. Slanting or arc-shaped chamfered portions may be formed at the four corners of the stator core 25. In FIG. 2A, a numeral 22 denotes the screw through hole. A rotor through hole 28, through which the rotor 13 passes, is formed in a central portion of the stator core 25.

The field magnets 26 and 27 are formed by injection-molding a synthetic resin in which magnetic particles G, such as magnetic powders, is mixed (so-called plastic magnet). As a preferable example, synthetic resin, into which rare-earth magnetic particles G are mixed, is injection-molded to form an arc shape, thereby forming a field magnet. The magnets 26 and 27 are formed by the injection molding and overlaid on an inner periphery 28a of the stator core 25, which defines the rotor through hole 28.

After the injection molding, the field magnets 26 and 27 are magnetized by magnetizing equipment (not shown). The magnetization is made in radial directions originating from the center of the stator core 25, i.e., the thickness directions of the field magnets 26 and 27.

By this magnetization, for example, the field magnet 26 in the left part of FIG. 2A is magnetized such that the surface A is the north pole and the rear surface B is the south pole. The field magnet 27 in the right part of FIG. 2A is magnetized such that the surface A is the south pole and the rear surface B is the north pole. The surfaces A of the field magnets 26 and 27 face the space within the rotor through hole 28. The rear surfaces B of the field magnets 26 and 27 are adhered to the inner periphery 28a of the rotor through hole 28.

One or more, for example, a plurality of grooves 30 continued to the inner periphery 28a are formed in the stator core 25. One or more, for example, a plurality of projections 29 are formed integral with the rear surfaces B of the field magnets 26 and 27. The projections 29 are inserted in the corresponding grooves 30. According to this embodiment, since the field magnets 26 and 27 are formed by injection molding, the grooves 30 are filled with magnet material simultaneously with the injection molding. For this reason, the above insertion is achieved by solidification of the magnet material filled in the grooves 30.

The projections 29 and the grooves 30 function as anti-exfoliation and positioning means of the field magnets 26 and 27. By this function, the field magnets 26 and 27 are positioned at the predetermined positions and prevented from moving along the circumferential directions of the inner periphery 28a.

The ends of the field magnet 26 along the arc are referred to as magnet end portions 26a and 26b. The ends of the field magnet 27 along the arc are referred to as magnet end portions 27a and 27b. The inner periphery 28a of the stator core 25 has a plurality of recesses 31. Each recess 31 is formed of a groove wider than the groove 30, and extends all over the thickness of the stator core 25. The recesses 31 function to suppress the magnetic flux leakage at the magnet end portions 26a, 26b, 27a and 27b.

One of the recesses 31 extends across the adjacent magnet end portions 26a and 27a of the field magnets 26 and 27. The other recesses 31 extends across the adjacent magnet end portions 26b and 27b of the field magnets 26 and 27. Each of the recesses 31 is defined by a recess surface 31a and a pair of side surfaces 31b and 31c. The side surfaces 31b and 31c are planes connecting the inner periphery 28a and the recess surface 31a.

The recess surface 31a of one recess 31 is formed of a plane that is located away from surfaces AC of the pair of magnet end portions 26a and 27a toward the outer periphery 25a of the stator core 25. The recess surface 31a is set back toward the outer periphery 25a of the stator core 25 from rear surfaces BD of the magnet end portions 26a and 27a.

The width W between the recess surface 31a and the outer periphery 25a is 5 mm or longer. The width W functions to assure flow of the magnetic flux necessary and sufficient for a predetermined performance. As a result, the cross-sectional area of the magnetic path between the magnet end portion 27a in the right part of FIG. 2A and the magnet end portion 26a in the left part of FIG. 2A assures flow of the necessary and sufficient magnetic flux. The rear surface BD of the magnet end portion 27a on the right assumes the north pole and the rear surface BD of the magnet end portion 26a on the left assumes the south pole.

One side surface 31b of the one recess 31 is continued to an edge E of the magnet end portion 26a. The one side surface 31b and the edge E are flush with each other, forming a flat plane, and no step or bend is formed therebetween. Likewise, the other side surface 31c of the one recess 31 is continued to an edge E of the magnet end portion 27a. The other side surface 31c and the edge E of the magnet end portion 27a. The other side surface 31c and the edge E are flush with each other, forming a flat plane, and no step or bend is formed therebetween. The magnet end portions 26a and 27a are located in proximity to the one recess 31 and face the recess 31. The distance between the side surfaces 31b and 31c of the one recess 31, i.e., the width of the recess surface 31a of the one recess 31, is substantially equal to the distance between the edges E of the magnet end portions 26a and 27a.

Likewise, the recess surface 31a of the other recess 31 is formed of a plane that is located away from surfaces AC of the magnet end portions 26b and 27b toward the outer periphery 25b of the stator core 25. The recess surface 31a is set back toward the outer periphery 25b of the stator core 25 from rear surfaces BD of the magnet end portions 26b and 27b.

The width W between the recess surface 31a and the outer periphery 25b is 5 mm or longer. The width W functions to assure flow of the magnetic flux necessary and sufficient for a predetermined performance. As a result, the cross-sectional area of the magnetic path between the magnet end portion 27b in the right part of FIG. 2A and the magnet end portion 26b in the left part of FIG. 2A assures flow of the necessary and sufficient magnetic flux. The rear surface BD of the magnet end portion 27b on the right assumes the north pole and the rear surface BD of the magnet end portion 26b on the left assumes the south pole.

One side surface 31b of the other recess 31 is continued to an edge E of the magnet end portion 26b. The one side surface 31b and the edge E are flush with each other, forming a flat plane, and no step or bend is formed therebetween. Likewise, the other side surface 31c of the other recess 31 is continued to an edge E of the magnet end portion 27b. The other side surface 31c and the edge E are flush with each other, forming a flat plane, and no step or bend is formed therebetween. The magnet end portions 26b and 27b are located in proximity to the other recess 31 and face the recess 31. The distance between the side surfaces 31b and 31c of the other recess 31, i.e., the width of the recess surface 31a of the other recess 31, is substantially equal to the distance between the magnet end portions 26b and 27b.

As described above, the one recess 31 is formed so as not to extend to the rear sides of the magnet end portions 26a and 27a as a preferred embodiment. Likewise, the other recess 31 is also formed so as not to extend to the rear sides of the magnet end portions 26b and 27b. Therefore, this is advantageous in that the effective magnetic flux of the field magnets 26 and 27 does not reduce.

On the other hand, the recess 31 may be extended as indicated by the two-dot-chain lines in FIG. 2A. In this case, the one recess 31 is formed so as to extend to the rear sides of the magnet end portions 26a and 27a. Likewise, the other recess 31 is formed so as to extend to the rear sides of the magnet end portions 26b and 27b.

However, with this structure, the air that goes around the rear sides of the magnet end portions 26a, 26b, 27a and 27b provides magnetic resistance. For this reason, the magnetic fluxes do not easily flow between the stator core 25 and the rear surfaces BD of the magnetic end portions 26a, 26b, 27a and 27b, which face the recesses 31. Accordingly, the amount of the magnetic flux flowing between the adjacent field magnets 26 and 27 is reduced. Consequently, the magnetic fluxes of the field magnets 26 and 27 cannot be effectively used.

The recess surface 31a of the one recess 31 between the adjacent magnetic end portions 26a and 27a is flat. The recess surface 31a does not have a projection, which divides the one recess 31 into two. The recess surface 31a of the other recess 31 between the adjacent magnetic end portions 26b and 27b is also flat. The recess surface 31a does not have a projection, which divides the other recess 31 into two.

The structure of the recesses 31 is thus simple. Therefore, this is advantageous in that the structure of a die for stamping out the core plates 25a can be simple, and the durability of the die can be increased.

The width of the recess 31 may be reduced by reduction in size of the direct current motor. In this case, if there is a projection which divides the recess 31 into two, it will easily lead to magnetic flux leakage from the magnetic end portions 26a, 26b, 27a and 27b. Consequently, it will read to increase in amount of magnetic flux leakage. On the other hand, the direct current motor with recesses 31 having flat recess surfaces 31a is advantageous since the aforementioned drawbacks are eliminated.

The brush devices 18 are attached to the motor frame 12, as shown in FIGS. 1A and 1B. Each brush device 18 has a carbon brush 18a. The carbon brush 18a is pressed by a coil spring 18c against the outer periphery of the commutator 17. Each brush device 18 has a terminal 18b. The terminal 18b is electrically connected to the battery H.

As shown in FIGS. 1A and 1B, the motor frame 11 is formed to also serve as an air blow guide. More specifically, the motor frame 11 is circular, and a plurality of wind inlet ports 11a are formed in a peripheral portion of the frame 11. As shown in FIG. 1A, the wind inlet ports 11a are arranged at regular intervals along the circumferential direction. As shown in FIG. 1B, a flange 11b is protruded outward from the outer periphery of the motor frame 11. The shaft through hole 35, through which the rotary shaft 13a is inserted, is formed in the central portion of the motor frame 11.

As shown in FIG. 1A, a plurality of blades 36 for commutation are provided on the rear surface of the motor frame 11. Each blade 36 is arc-shaped. The adjacent blades 36 form a wind path 37 for rectification. A wind inlet port 11a is open at a peripheral portion of each wind path 37. Therefore, the wind introduced inside the motor frame 11 through the wind inlet port 11a is converted to a static pressure upon reception of a diffuser action while passing through the wind path 37. Further, the wind is blown toward the stator 16 through the rear side of the motor frame 11.

As shown in FIG. 1B, the fan section 3 has a centrifugal fan 41 and a fan cover 42. The fan 41 and the fan cover 42 are made of metal.

The fan 41 is connected to an axial end portion of the rotary shaft 13a passing through the bearing 14 and the shaft through hole 35. The connection is achieved by screwing a nut 43 to the axial end portion. The fan cover 42 has a cylindrical peripheral wall portion. The peripheral wall portion is engaged with the outer periphery of the motor frame 11. The peripheral wall portion is in contact with the flange 11b. As a result, the fan cover 42 is attached to the motor frame 11 with the built-in depth restricted. The fan cover 42 has an opening 42a, which enters an intake of the fan 41.

In the stator 16 included in the motor-blower 1, the recesses 31 of the stator core 25 are provided so as not to impair the effective magnetic path of the stator core 25. These recesses 31 are open to the rotor through hole 28 of the stator core 25, and faces the edges E of the magnet end portions 26a, 26b, 27a and 27b.

Owing to the recesses 31, the distance between the recess surface 31a and the surface AC of the nearest magnetic end portion 26a, 26b, 27a or 27b can be increased.

The magnetic resistance due to the air in the recesses 31 is greater than the magnetic resistance in the stator core 25, which easily passes magnetic flux. Therefore, the increase in distance described above can reduce the magnetic flux from the north pole to the south pole at each of the magnetic end portions 26a, 26b, 27a and 27b. In other words, the magnetic flux leakage at each of the magnetic end portions 26a, 26b, 27a and 27b can be suppressed.

Therefore, the magnetic flux at each of the magnetic end portions 26a, 26b, 27a and 27b can be effectively utilized by the provision of the stator 16. Accordingly, the torque of the rotor 13 can be increased. As the torque of the rotor 13 increases, the rotation speed of the fan 41 of the fan section 3 increases. For this reason, the air blowing capacity of the motor-blower 1 can be increased.

Figure 3A:
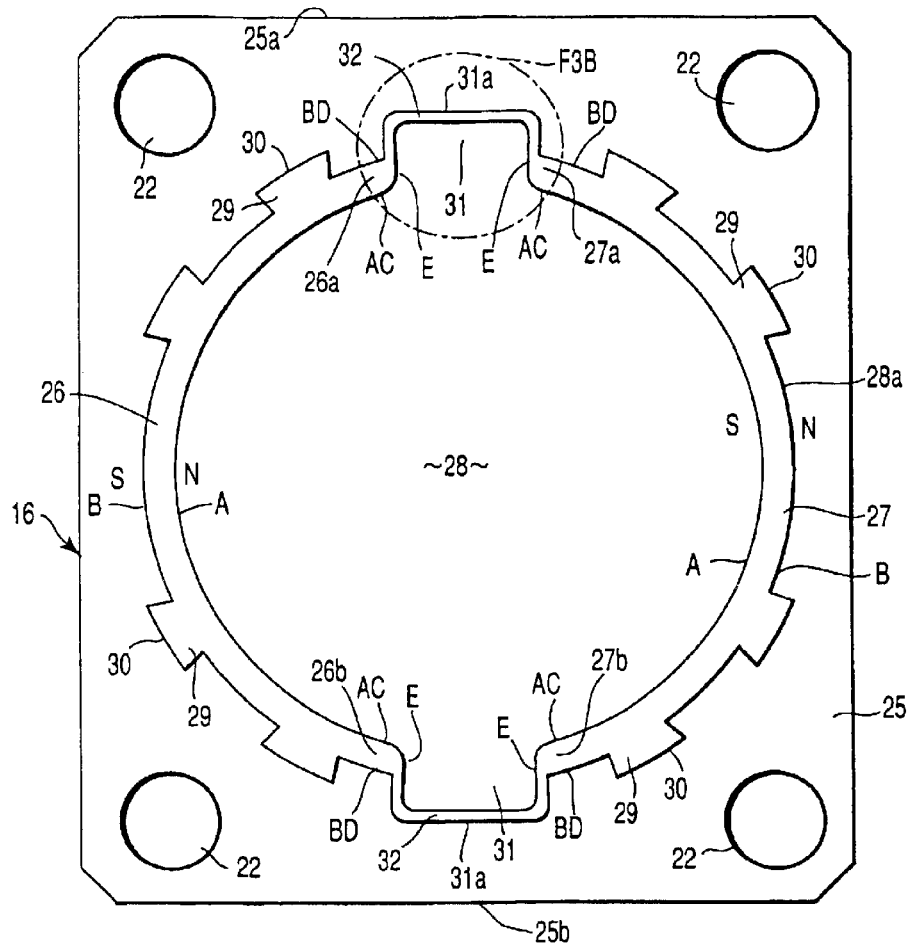
FIG. 3A is a plan view of a stator included in a direct current motor according to a second embodiment of the present invention.
Figure 3B:
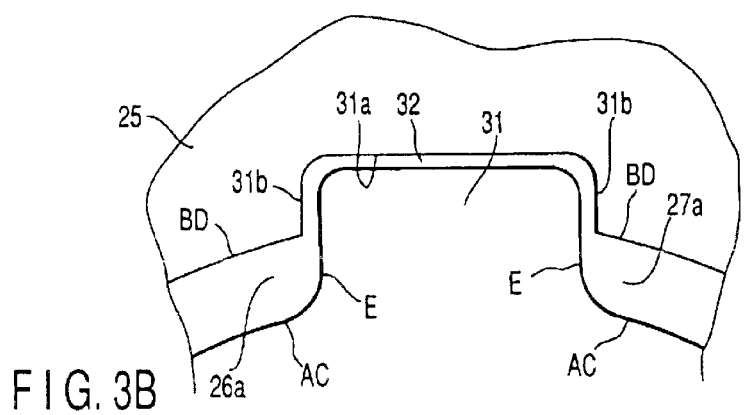
FIG. 3B is an enlarged view of a portion F3B in FIG. 3A.

FIGS. 3A and 3B show a second embodiment of the present invention. The embodiment is basically the same in structure as the first embodiment. Therefore, the same structural portions as those of the first embodiment are identified by the same reference numerals as those of the first embodiment, and the descriptions of the structure and the function will be omitted. Portions different from those of the first embodiment will be described below.

The field magnets 26 and 27, formed by injection molding plastic magnet, are connected to each other by recess covers 32. Each cover 32 covers the inner surface of the recess 31. The inner surface of the recess 31 is defined by the recess surface 31a and the side surfaces 31b and 31c.

One of the recess covers 32 is injection-molded integral with the field magnets 26 and 27. The one cover 32 extends across the magnetic end portions 26a and 27a. The other of the recess cover 32 is also injection-molded integral with the field magnets 26 and 27. The other cover 32 extends across the magnetic end portions 26b and 27b.

Both recess covers 32 are much thinner than the field magnets 26 and 27. More specifically, the thickness of the recess covers 32 is set to 0.3±0.1 mm, while the thickness of the field magnets 26 and 27 is 1.45 mm. Therefore, the recess covers 32 are magnetically saturated easily. The recess covers 32 are not magnetized. The structures of the embodiment, including those not shown in FIGS. 3A and 3B, are the same as those of the motor-blower having the motor of the first embodiment, except for the structures described above.

In the second embodiment also, the stator 16 has the recesses 31, which are open to the rotor through hole 28. For this reason, the magnetic flux leakage at each of the magnetic end portions 26a, 26b, 27a and 27b, which face the recesses 31, can be suppressed. Accordingly, the torque of the rotor 13 can be increased. This is because the magnetic resistance against the magnetic flux from the north pole to the south pole at each of the magnetic end portions 26a, 26b, 27a and 27b is increased.

The recess covers 32 integrally connect the adjacent field magnets 26 and 27. Each recess cover 32 has the same shape as that of the recess 31 and formed of a thin film covering the inner surface of the recess 31. Therefore, the recess covers 32 are easily saturated by a very small amount of magnetic flux. Owing to the magnetic saturation, the magnetic flux leakage between the magnets 26 and 27 through the recess covers 32 is substantially negligible. Consequently, even if the recess covers 32 are provided, the torque of the rotor can be increased.

The field magnets 26 and 27 and the recess covers 32 are integrally injection-molded to the inner surface 28a of the stator core 25. A pair of molding dies (not shown) for this injection molding is not brought into contact with the inner surfaces of the recesses 31 for forming space for molding the recess covers 32.

In other words, the space for molding the field magnets and the space for molding the recess covers 32 are continued to form a loop. Hence, the die portion of one molding die, inserted through the rotor through hole, is not brought into contact with the inner periphery 28a of the rotor through hole 28. Therefore, the one molding die does not wear by friction against the inner surface of the stator core 25. Consequently, the lifetime of the molding die can be extended.

Moreover, since the molding die does not wear, burr-like projecting portions due to wear are not formed during the injection molding. Although the recess covers 32 are thin films, both ends of each cover 32 are integrally connected to the field magnets 26 and 27. Therefore, the recess covers 32 cannot be peeled off. Accordingly, the field magnets 26 and 27 are not liable to peel off from the inner periphery of the stator core 25, triggered by the peeling of the recess cover 32. Thus, the stator 16 has high durability.

Figure 4:
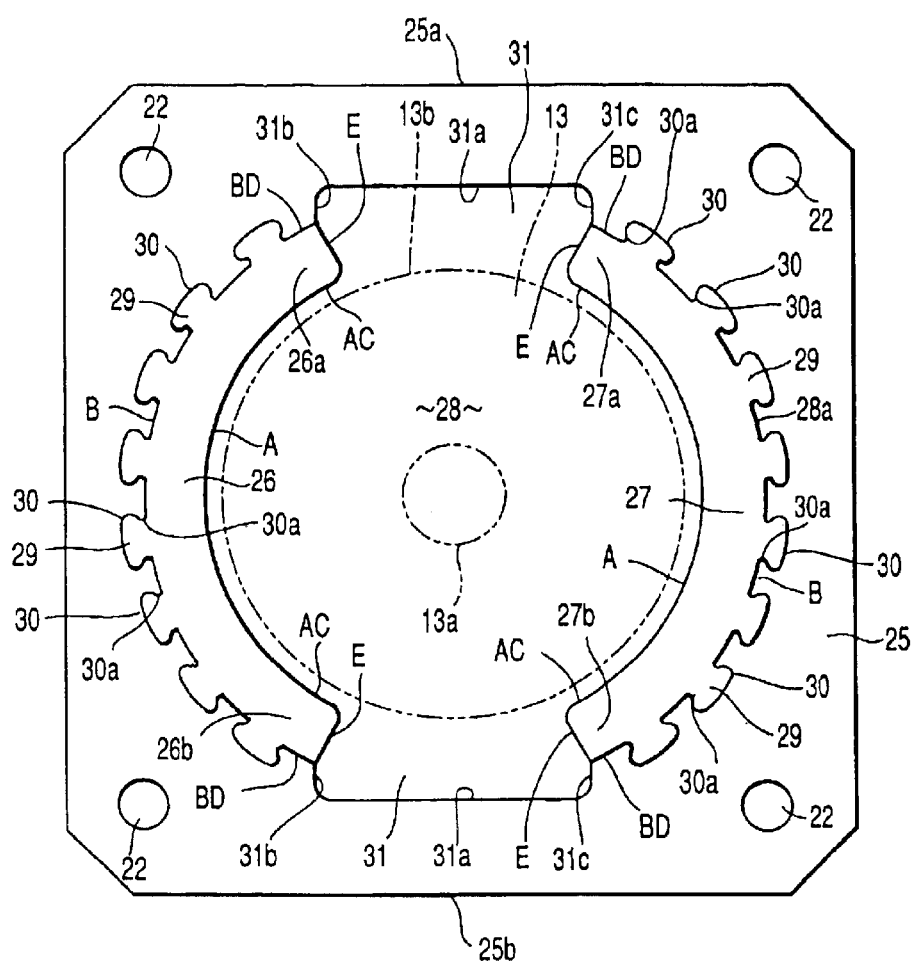
FIG. 4 is a plan view of a stator of a direct current motor according to a third embodiment of the present invention.

FIG. 4 shows a third embodiment of the present invention. The embodiment is basically the same in structure as the first embodiment. Therefore, the same structural portions as those of the first embodiment are identified by the same reference numerals as those of the first embodiment, and the descriptions of the structure and the function will be omitted. Portions different from those of the first embodiment will be described below.

The edge E of the magnet end portion 26a or 27a are connected to the side surface 31b or 31c of one recess 31, so as to form a bend. The edge E of the magnet end portion 26b or 27b are connected to the side surface 31b or 31c of the other recess 31, so as to form a bend.

In the third embodiment also, the stator 16 has the recesses 31, which are open to the rotor through hole 28. The magnet end portions 26a, 26b, 27a and 27b are provided in proximity to the recesses 31 and face the recesses 31. For this reason, the magnetic flux leakage at each of the magnetic end portions 26a, 26b, 27a and 27b can be suppressed, thereby increasing the torque of the rotor 13.

The stator core 25 has three or more grooves 30 for one field magnet. The grooves 30 are arranged at regular intervals along the circumferential direction of the inner periphery 28a, which defines the rotor through hole 28. Projections 29 of the same number as that of the grooves 30 are formed in the rear surface portion of the field magnets 26 and 27, which are injection molded. The projections 29 are arranged at regular intervals. The projections 29 are inserted in the corresponding grooves 30.

Owing to the insertion, the arc-shaped field magnets 26 and 27 are uniformly supported by the stator core 25 along the direction in which the arc is extending. For this reason, an increase in temperature with the operation of the direct current motor or external vibration or shock can be uniformly dispersed over all regions of the field magnets 26 and 27. As a result, the durability of the direct current motor can be increased.

An entrance portion 30a of each groove 30, connected to the inner periphery 28a, is narrow. Accordingly, the projection 29 inserted in each groove 30 has a constricted root portion. Hence, the strength of each groove 30 for holding the corresponding projection 29 integral with the field magnets 26 and 27 is increased. Thus, this structure also allows an increase in temperature with the operation of the direct current motor or external vibration or shock to uniformly disperse over all regions of the field magnets 26 and 27. As a result, the durability of the direct current motor can be increased. The structures of the embodiment, including those not shown in FIG. 4 are the same as those of the motor-blower having the motor of the first embodiment, except for the structures described above.

FIGS. 5 to 9 show a fourth embodiment of the present invention. The embodiment is basically the same in structure as the first embodiment. Therefore, the same structural portions as those of the first embodiment are identified by the same reference numerals as those of the first embodiment, and the descriptions of the structure and the function will be omitted. Portions different from those of the first embodiment will be described below.

The stator core 25, having a rectangular outer shape, is formed of a stack of a number of core plates 25a, made of silicon steel plates or the like. The core plate 25a is stamped out from a material steel plate by means of a press.

A rotor through hole 28 is formed in a central portion of the stator core 25. The stator core 25 has two recesses open to the rotor through hole 28. The recesses 31 divide the inner periphery 28a, which defines the rotor through hole 28, in the circumferential direction. The field magnets 26 and 27 are respectively provided in the divided portions of the inner periphery 28a.

The stator core 25 has a plurality of, for example, four grooves 30. Each groove extends from the center of the rotor through hole 28 in a radial direction. Each portion of the stator core 25 has dimensions such that the flux passing through the field magnets 26 and 27 and the rotor 13 is not saturated, regardless of the rotor through hole 28, the groove 30 and the recess 31.

The end of each groove 30 opposite to the rotor through hole 28 is semicircular. The groove 30 has a shape having a width corresponding to the diameter of the semicircle and reaching the rotor through hole 28. The grooves 30 extend from the rotor through hole 38 in the radial directions substantially along the diagonals. In this case, the substantially diagonal directions include the diagonals and lines connecting between the center of the stator core 25 and points near both sides of the diagonal lines.

Figure 5:
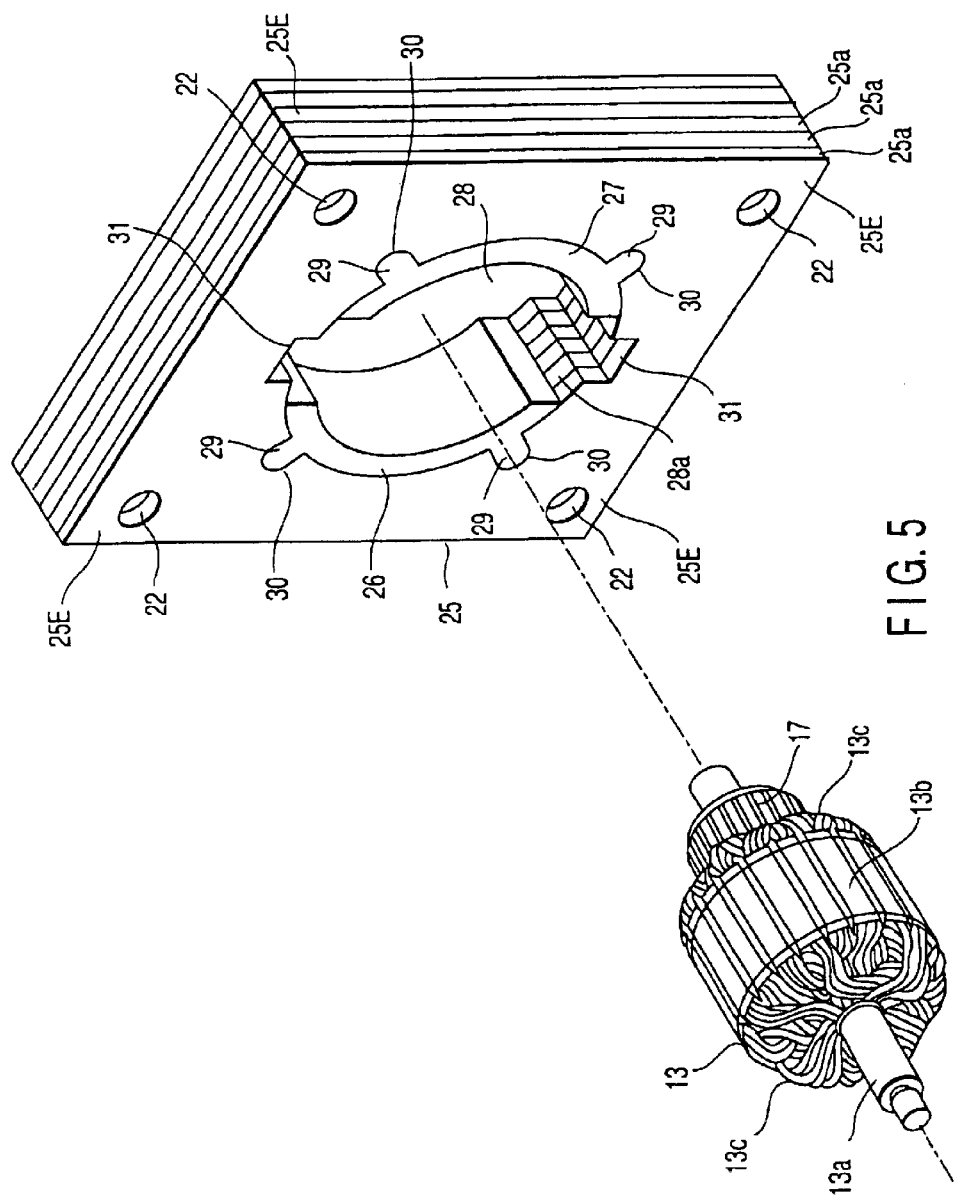
FIG. 5 is a perspective view of a direct current motor according to a fourth embodiment of the present invention, showing a state in which a stator and a rotor of are separated.
Figure 6:
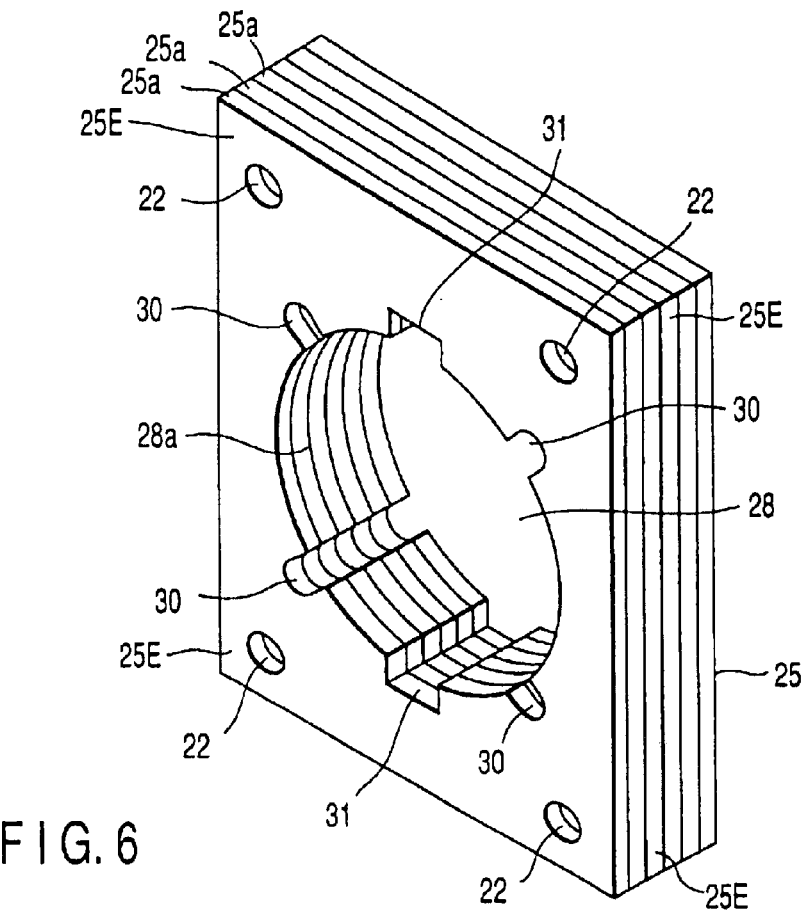
FIG. 6 is a perspective view of the stator core of the stator of the direct current motor according to the fourth embodiment.
Figure 7:
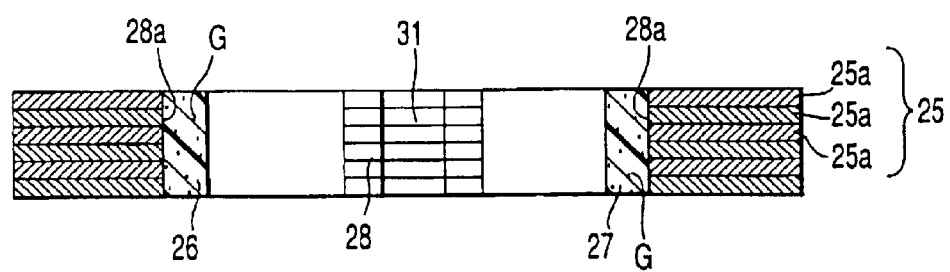
FIG. 7 is a cross-sectional view of the stator of the direct current motor according to the fourth embodiment.

Each field magnet 26 or 27 covers at least one groove 30 and does not cover the recess 31. In this embodiment, each of the field magnets 26 and 27 covers two grooves 30, as shown in FIG. 5. In other words, the field magnets 26 and 27 are provided on both sides of the recesses 31.

The field magnets 26 and 27 are formed by injection-molding a synthetic resin to the inner periphery 28a of the stator core 25. Magnetic particles G, such as magnetic powders, are mixed in the synthetic resin. The rotor 13 is located between the field magnets 26 and 27. Therefore, the arc-shaped inner surfaces of the field magnets 26 and 27, exposed inside the rotor through hole 28, form arcs having a diameter slightly greater than the maximum diameter of the rotor 13.

The field magnets 26 and 27 are injection molded as follows. First, the stator core 25 of a predetermined shape is inserted in and positioned at a predetermined position of a molding die (not shown). Then, the molding dies are clamped. Thereafter, a molten synthetic resin, in which magnetic particles G such as magnetic powers are mixed, is injected into a molding space inside the molding die. As a result, the field magnets 26 and 27 are injection molded to the inner periphery 28a of the stator core 25.

Thus, the step of forming the field magnets 26 and 27 and the step of attaching them to the inner periphery 28a are completed by one step of injection molding the field magnets 26 and 27 to the inner periphery 28a. Therefore, the number of manufacturing steps is reduced, thereby reducing the manufacturing cost. Moreover, it is unnecessary to attach an independently formed field magnet to a predetermined position by means of a jig. Hence, the field magnets 26 and 27 can easily be produced, while the accuracy of the attachment positions of the field magnets 26 and 27 is maintained. The field magnets 26 and 27 may be injection molded by an outsert molding, instead of the insert molding described above.

In the injection molding, the magnetic particles G may be rare earth based magnetic powders, for example, neodymium-iron-boron magnetic powders. The synthetic resin may be but not limited to Nylon 12.

With the injection molding, the grooves 30 are also filled with the synthetic resin. Therefore, the contact area between the stator core and the field magnets is increased. Moreover, the two grooves covered by one field magnet extend in radial directions different from each other. The synthetic resin, which fills the two grooves 30, constitutes the projections serving as anchors. Therefore, the two projections suppress shape-contraction of the field magnet formed integral with it. The suppression is made with respect to the direction in which the arc of the field magnet extends.

Figure 8:
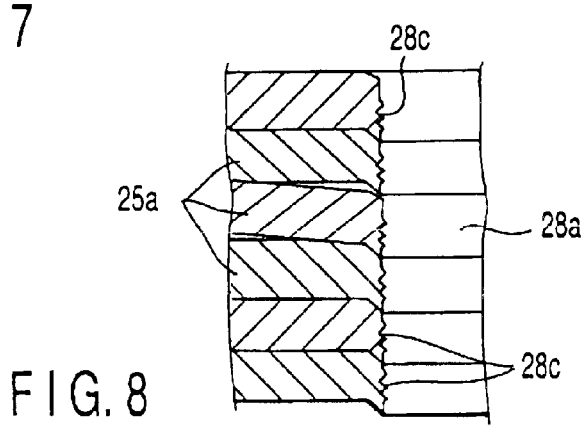
FIG. 8 is an enlarged view of a part of the stator shown in FIG. 7.

Each of the core plates 25a of the stator core 25 is a product stamped by a press. Therefore, as schematically shown in FIG. 8, small gaps or irregularities 28c are formed on the inner periphery 28a of the rotor through hole 28. The cause of this will be described below. There are deformations, such as burr-like roughness projecting in the stamped direction, in the stamped hole of each core plate 25. A part of the stamped hole is coarse. The positions of the stacked core plates 25a are varied. The stamped holes are slightly different in size. Under these conditions, the field magnets 26 and 27 are injection molded to the inner periphery 28a.

For this reason, the synthetic resin forming the field magnets 26 and 27 injection molded at a high pressure enters the small gaps or irregularities 28c. As a result, the area where the inner periphery 28a contacts the field magnets 26 and 27 can be increased. Accordingly, the adhesion of the field magnets 26 and 27 to the inner periphery 28a is increased.

As described above, shape-contraction of the field magnets 26 and 27 is suppressed by the grooves 30. In addition, the adherability of the field magnets 26 and 27 to the inner periphery 28a is increased. Therefore, when the rotor 13 is passed through the rotor through hole 28, even if the rotor 13 is brought into contact with the field magnets 26 and 27, the field magnets 26 and 27 cannot be removed.

As described above, the grooves 30 are provided along the substantially diagonal directions of the rectangular stator core 25. The distance between the inner periphery 28a of the rotor through hole 28 and the outer periphery at four corners 25E of the stator core 25 is the longest of all portions of the stator core 25.

Figure 9:
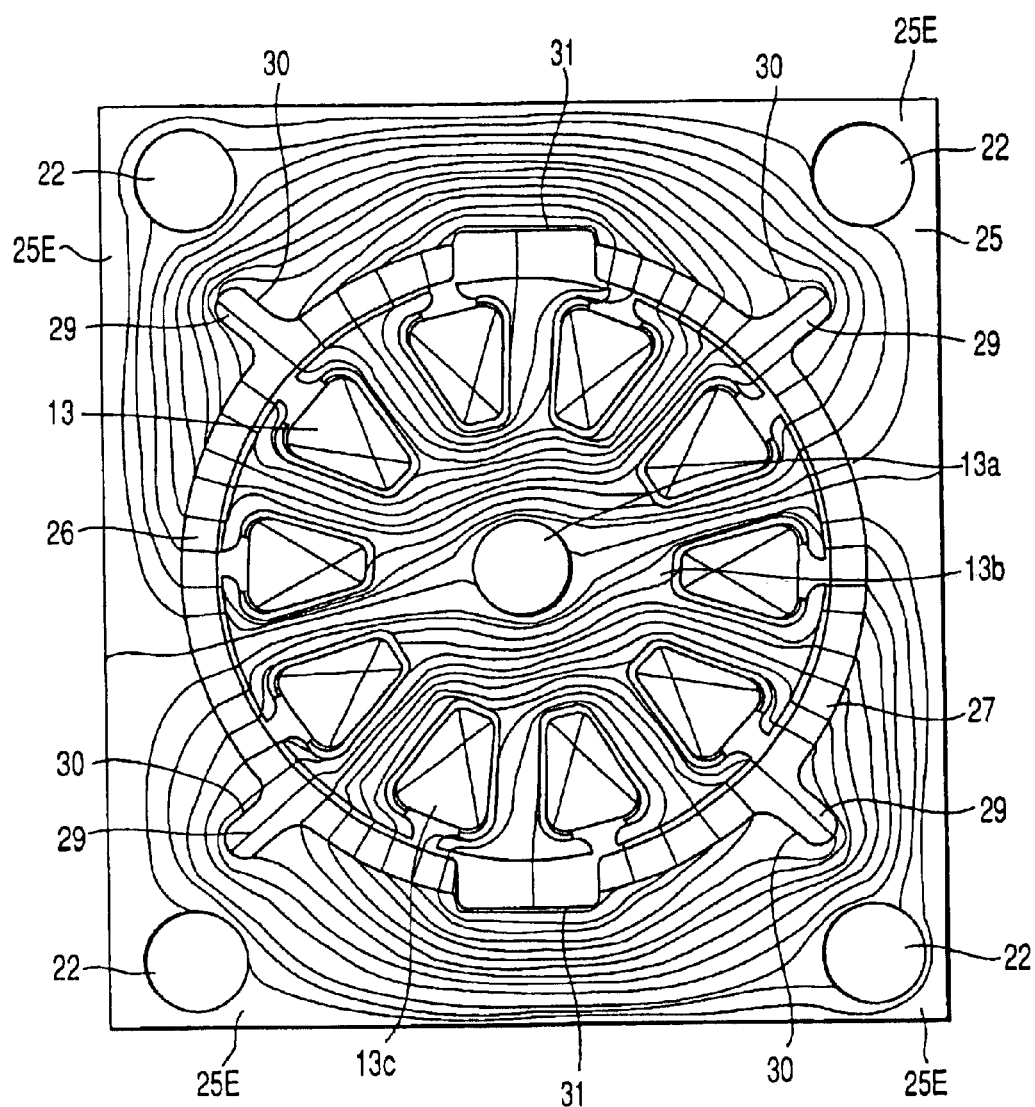
FIG. 9 is a diagram showing a magnetic flux distribution of the direct current motor according to the fourth embodiment.

For this reason, it is assured that the magnetic path is larger in the case where the grooves 30 are formed in the four corners 25E as compared to the case where the grooves are provided along the lines connecting the center of the core 25 and a substantially middle portion of each side of the stator core 25. Thus, since the grooves 30 are formed in portions which do not substantially obstruct the magnetic fluxes flowing through the stator core 25, the performance of the direct current motor is not lowered. FIG. 9 schematically shows the state of the magnetic fluxes flowing through the stator core 29 with fine lines. The structures of the embodiment, including those not shown in FIGS. 5 to 9, are the same as those of the motor-blower having the motor of the first embodiment, except for the structures described above.

The present invention is not limited to the above embodiments. For example, the motor frame may be formed of a first motor frame made of metal and a second motor frame made of metal. In this case, the first motor frame is shaped as a cylinder having a recess surface, and the second motor frame is attached to the opening of the first motor frame. Both the first and second motor frames have bearing receiving portions, between which most part of the rotor is located.

As described above, the present invention is effective in the field of direct current motors useful for converting electrical energy to torque, the field of manufacturing the direct current motors, and the technical field of using the direct current motors.

What is claimed is:

1. A motor of an inner-rotor type driven by a direct-current power supply, comprising:

a stator including a stator core with a rotor through hole in a central portion and a plurality of recesses open to the rotor through hole, and a plurality of field magnets which are attached to an inner periphery defining the rotor through hole and generate a magnetic field, each recess having a recess surface which is away from a surface of the magnet end portion and set back toward an outer periphery of the stator core from a rear surface of the magnet end portion;

a motor frame which supports the stator; and a rotor passed through the rotor through hole and rotatably supported by the motor frame, wherein the recess extends between magnet end portions of adjacent field magnets;

each of the field magnets is formed by injection molding synthetic resin, with which magnetic particles are mixed, to the inner periphery of the stator core; and a thin film recess cover is integrally formed with and extends across the magnet end portions of the adjacent field magnets, the recess cover covering an inner surface of the recess.

2. The motor according to claim 1, wherein the stator core is formed of a stack of a plurality of stamped core plates.

3. The motor according to claim 1, wherein the stator core has grooves, which are continued to the inner periphery and into which projections integrally projected from rear surfaces of the field magnets are inserted.

4. The motor according to claim 3, wherein at least three grooves and projections are arranged at regular intervals.

5. The motor according to claim 1, wherein the stator core has a substantially rectangular outer shape, and the stator core has grooves, which are continued to the inner periphery and correspond to four corners of the stator core, and into which projections integrally projected from rear surfaces of the field magnets are inserted.

6. The motor according to claim 2, wherein the core plates comprise silicon steel plates.

* * * * *